(12) United States Patent
Aldriweesh et al.

(10) Patent No.: US 12,527,592 B1
(45) Date of Patent: Jan. 20, 2026

(54) STENOSIS REPAIR USING LARYNGEAL FORCEPS HAVING MEASUREMENT SCALE

(71) Applicant: KING SAUD UNIVERSITY, Riyadh (SA)

(72) Inventors: Bshair Abdulrahman Aldriweesh, Riyadh (SA); Ahmed Yousif Alammar, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/061,275

(22) Filed: Feb. 24, 2025

Related U.S. Application Data

(62) Division of application No. 18/776,647, filed on Jul. 18, 2024, now abandoned.

(51) Int. Cl.
   *A61B 17/28* (2006.01)
   *A61B 17/00* (2006.01)
   *A61B 90/00* (2016.01)

(52) U.S. Cl.
   CPC ...... *A61B 17/282* (2013.01); *A61B 17/00234* (2013.01); *A61B 17/2816* (2013.01);
   (Continued)

(58) Field of Classification Search
   CPC ............ A61B 17/282; A61B 17/00234; A61B 17/2816; A61B 17/2833;
   (Continued)

(56) References Cited

U.S. PATENT DOCUMENTS 1,513,367 A * 10/1924 Brix ............... A61B 17/02
                                            606/208
1,528,273 A * 3/1925 Shwed ............... G01B 5/00
                                            33/799

(Continued)

FOREIGN PATENT DOCUMENTS

| CN | 210962210 U | 7/2020 |
| CN | 211704759 U | 10/2020 |
| CN | 218870403 U | 4/2023 |

OTHER PUBLICATIONS

Farzad Izadi, Autologous Cricoid Cartilage as a Graft for Airway Reconstruction in an Emergent Technique—A Case Report, Iranian Journal of Otorhinolaryngology, vol. 28(2), Serial No. 85 (Year: 2016).*

*Primary Examiner* — Mohamed G Gabr
(74) *Attorney, Agent, or Firm* — Nath, Goldberg & Meyer; Joshua B. Goldberg

(57) ABSTRACT

A method for repairing for repairing stenosis in an airway of a patient is disclosed using laryngeal forceps having a measurement scale. The method includes harvesting a cartilage graft from a patient and inserting a laryngoscope into the respiratory tract of the patient. The stenotic region is prepared by removing stenotic tissue to create a recipient site for insertion of the cartilage graft. A width measurement of the recipient site is obtained using the laryngeal forceps. The width measurement is shown on the laryngeal forceps indicating a distance value between the first jaw tip and second jaw tip of the forceps. The measurement scale may include graduated markings or a digital display. A thumb-screw may be included for locking the jaws and handle in a fixed position. The forceps may include triangular jaws with pointers for precise alignment with and measurement of the stenotic region.

6 Claims, 5 Drawing Sheets

(52) U.S. Cl.
CPC .......... *A61B 17/2833* (2013.01); *A61B 90/06* (2016.02); *A61B 2017/00238* (2013.01); *A61B 2017/00296* (2013.01); *A61B 2090/061* (2016.02)

(58) Field of Classification Search
CPC ........... A61B 2017/00238; A61B 2017/00296; A61B 90/06; A61B 2090/061
See application file for complete search history.

(56) References Cited

U.S. PATENT DOCUMENTS

| | | | |
|---|---|---|---|
| 4,845,646 A | | 7/1989 | Marquis et al. |
| 5,484,447 A | * | 1/1996 | Waldock ................. A61F 9/013 606/198 |
| 7,296,361 B2 | | 11/2007 | Chi et al. |
| 11,543,225 B2 | | 1/2023 | Fuchigami et al. |
| 2005/0115093 A1 | * | 6/2005 | Chi ........................ A61B 90/06 33/512 |
| 2016/0223312 A1 | | 8/2016 | Zuther |

* cited by examiner

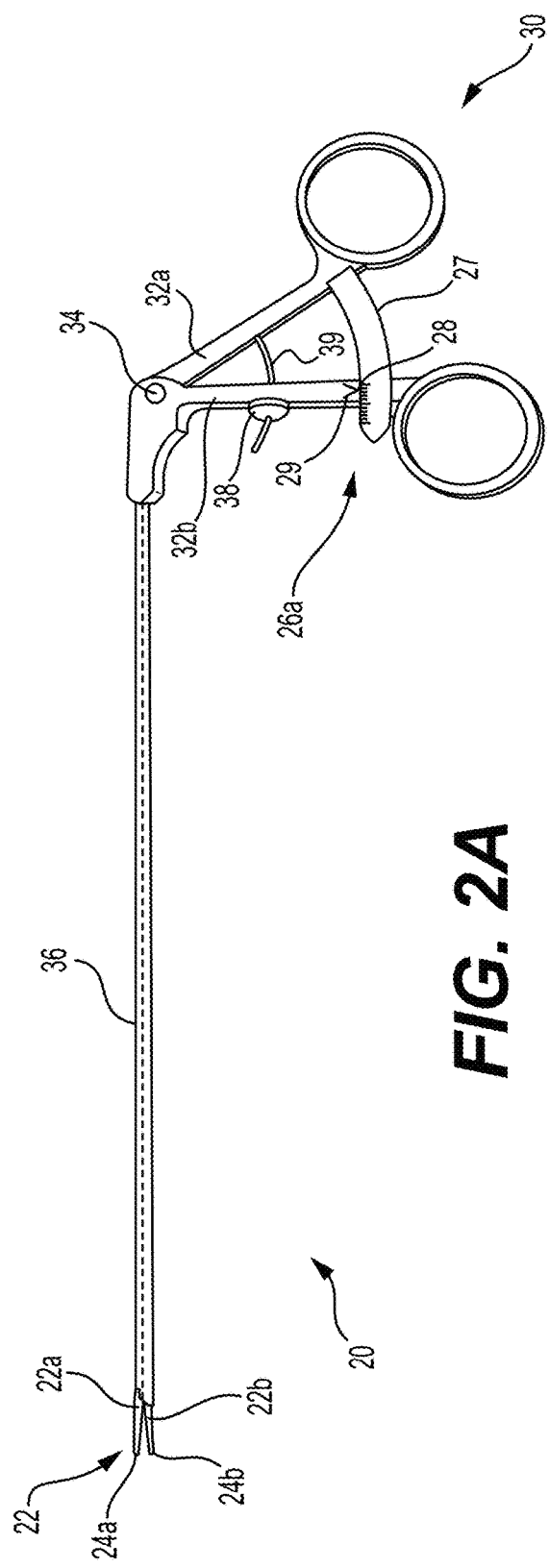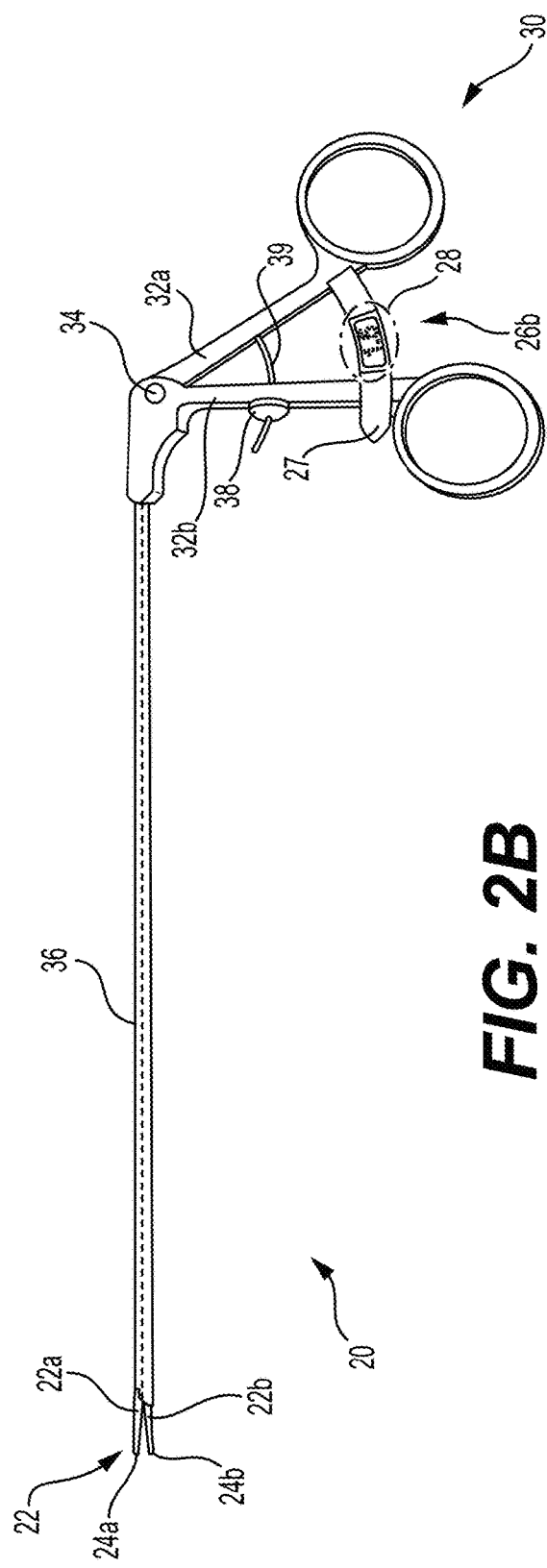

STENOSIS REPAIR USING LARYNGEAL FORCEPS HAVING MEASUREMENT SCALE

CROSS-REFERENCE TO RELATED APPLICATION

This application is a divisional of U.S. patent application Ser. No. 18/776,647, filed on Jul. 18, 2024, the entire contents of which are incorporated herein by reference.

BACKGROUND

Field

The disclosure of the present patent application relates to stenosis repair, and particularly to a laryngeal forceps having a measurement scale for use in stenosis repair surgical procedures.

Description of Related Art

Posterior glottis stenosis (PGS) is a narrowing of the airway at the back of the glottis, where the vocal cords are located. It often results from scarring or trauma, such as prolonged intubation or surgery. This condition can lead to voice changes, difficulty breathing, and stridor. Traditionally, posterior glottis stenosis repair is performed through an open transcervical approach, which is a surgical technique used to access the airway through an incision in the neck. There are disadvantages, however, of an open transcervical approach compared to an endoscopic approach, such as increased invasiveness, scarring, recovery time, longer hospital stays and risk of complications.

Since its introduction, endoscopic posterior cricoid split and rib grafting (EPCS/RG) has been performed in patients with subglottic stenosis (SGS), PGS, and bilateral vocal fold paralysis. EPCS/RG has proven superior to the traditional transcervical approach in operative time, aspiration risk and avoidance of neck incisions with minimal morbidity. EPCS/RG includes the placement of a rib cartilage graft in the space created after the posterior midline division of the cricoid lamina. In order for this procedure to be successful, it requires a properly sized cartilage graft width to provide for an adequate expansion of the glottic respiratory chink.

The main focus of definitive surgical correction is to expand the posterior glottis with a cartilage graft. There are no established standards on the width of the posterior rib graft as it varies with the patient's age. A retrospective review on 48 pediatric patients (mean age=45 months) who underwent posterior rib graft placement reported their data on the width of rib graft utilized in their patients. The mean width of the posterior graft was 7.43 mm in patients who underwent a sutured technique and 4.27 mm in those undergoing a sutureless technique. Another study focused on the subgroup of patients with successful surgical outcome following laryngotracheal reconstruction. This study included 24 patients with posterior grafts (mean age±SD was 6.3±6.6 years). The mean width of the posterior graft size was 4.2±0.9 mm. From the data provided, it is clear that the variation with age is yet to be defined, and until now, the width of the graft is subjective (surgeon based) without an objective tool. There are no current measurement tools to acquire the exact maximum width of the space created by dividing the posterior cricoid lamina. Thus, a new tool and method for stenosis repair solving the aforementioned problems is desired.

SUMMARY

A method for repairing stenosis in an airway of a patient is disclosed. The method includes harvesting a cartilage graft from the patient and inserting a laryngoscope into a respiratory tract of the patient to obtain visual access of a stenotic region within the patient's respiratory tract. The stenotic region is prepared by removing stenotic tissue to create a recipient site for insertion of the cartilage graft. A width measurement is obtained of the recipient site where the cartilage graft will be placed by inserting a laryngeal forceps into the laryngoscope and aligning a first pointer tip and second pointer tip of the laryngeal forceps with first and second sides, respectively, of the recipient site. The width measurement is shown by a measurement scale provided on the laryngeal forceps indicating a distance value between the first pointer tip and second pointer tip aligned with respective first and second sides of the recipient site. The method further includes shaping the cartilage graft to a width equal to or less than the width measurement of the recipient site, as measured by the laryngeal forceps, and inserting the cartilage graft into the recipient site.

Further disclosed herein is a laryngeal forceps for stenosis repair. The laryngeal forceps terminate in a pair of clamping jaws including a first jaw having a first pointer tip and second jaw having a second pointer tip. The first jaw and second jaw may be triangular and tapered in shape. A handle of the forceps includes a first arm and second arm joined at a pivot point. A shaft mechanically couples the pair of clamping jaws to the handle and opening and closing of the clamping jaws is controlled through an opening and closing motion of the first arm and second arm. The shaft houses mechanical means for opening and closing the pair of clamping jaws through an opening and closing motion of the handle. A measurement scale is included on the forceps and includes a numerical display indicative of a distance between the first pointer tip and second pointer tip.

The measurement scale for the laryngeal forceps may include an arcuate arm extending between the first arm and second arm of the handle. A plurality of graduated size markings is included on the arcuate arm and a pointer indicates a value among the graduated size markings equaling a distance between the first pointer tip and second pointer tip. A thumbscrew or other clamp may be included for locking the first arm and second arm of the handle into a fixed position, thereby correspondingly fixing the first jaw and second jaw.

The shaft of the laryngeal forceps may be between about 20 cm and about 60 cm long. In particular, the shaft may be about 24 cm long. A diameter of the shaft may be between about 3 mm and about 7 mm. In particular, a diameter of the shaft may be about 4 mm.

The measurement scale of the laryngeal forceps may include a digital display with a numerical reading equaling a distance between the first pointer tip and second pointer tip.

These and other features of the present subject matter will become readily apparent upon further review of the following specification.

BRIEF DESCRIPTION OF DRAWINGS

FIG. 2A is a perspective view of a laryngeal forceps having a graduated measurement scale.

FIG. 2B is a perspective view of a laryngeal forceps having a digital measurement scale.

Similar reference characters denote corresponding features consistently throughout the attached drawings.

DETAILED DESCRIPTION

Figure 1A:
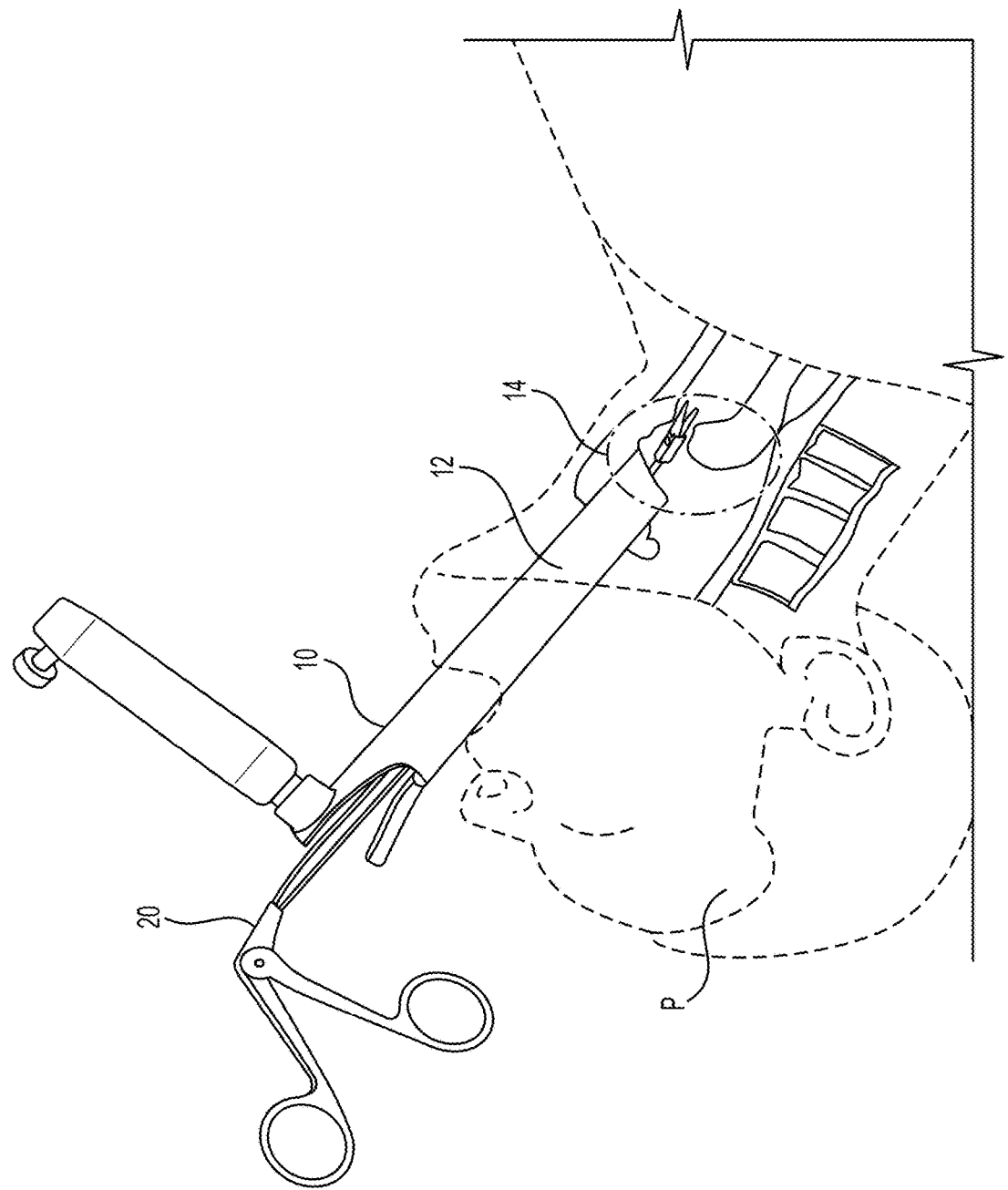
FIG. 1A is an environmental perspective view of a laryngeal forceps inserted within a laryngoscope during a stenosis repair procedure.
Figure 1B:
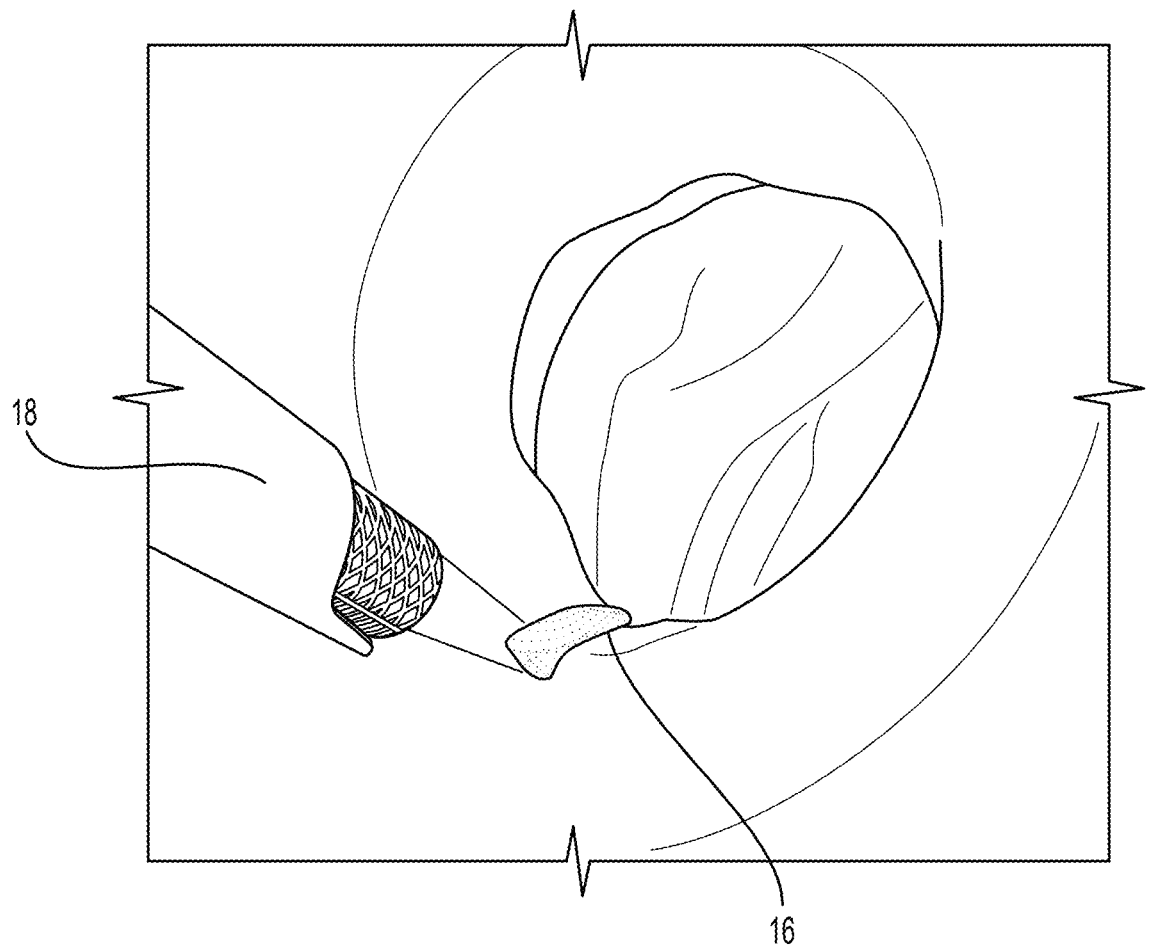
FIG. 1B is an environmental perspective view of a laser fiber used to create a recipient site for a cartilage graft.

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Referring to FIGS. 1A-1E, a method for repairing stenosis in an airway of a patient is disclosed. The method begins by harvesting a cartilage graft from a patient. In stenosis repair, cartilage grafts are often harvested from areas such as the nasal septum, ear (auricular cartilage), or rib (costal cartilage). In particular, in the case of posterior subglottic stenosis, a costal cartilage is most often used. The method includes insertion of a laryngoscope 10 into a respiratory tract 12 of a patient P to obtain visual access of a stenotic region 14 within the patient's respiratory tract 12. The stenotic region 14 is prepared by removing stenotic tissue to create a recipient site 16 for insertion of the cartilage graft C. The recipient site 14 may be prepared, for example, by laser ablation using a $CO_2$ laser fiber 18, shown in FIG. 1B, allowing for precise excision or vaporization of the stenotic tissue. Other instruments, such as round or sickle knife with balloon dilators may be used, as needed, in the preparation of recipient site 16.

Figure 1C:
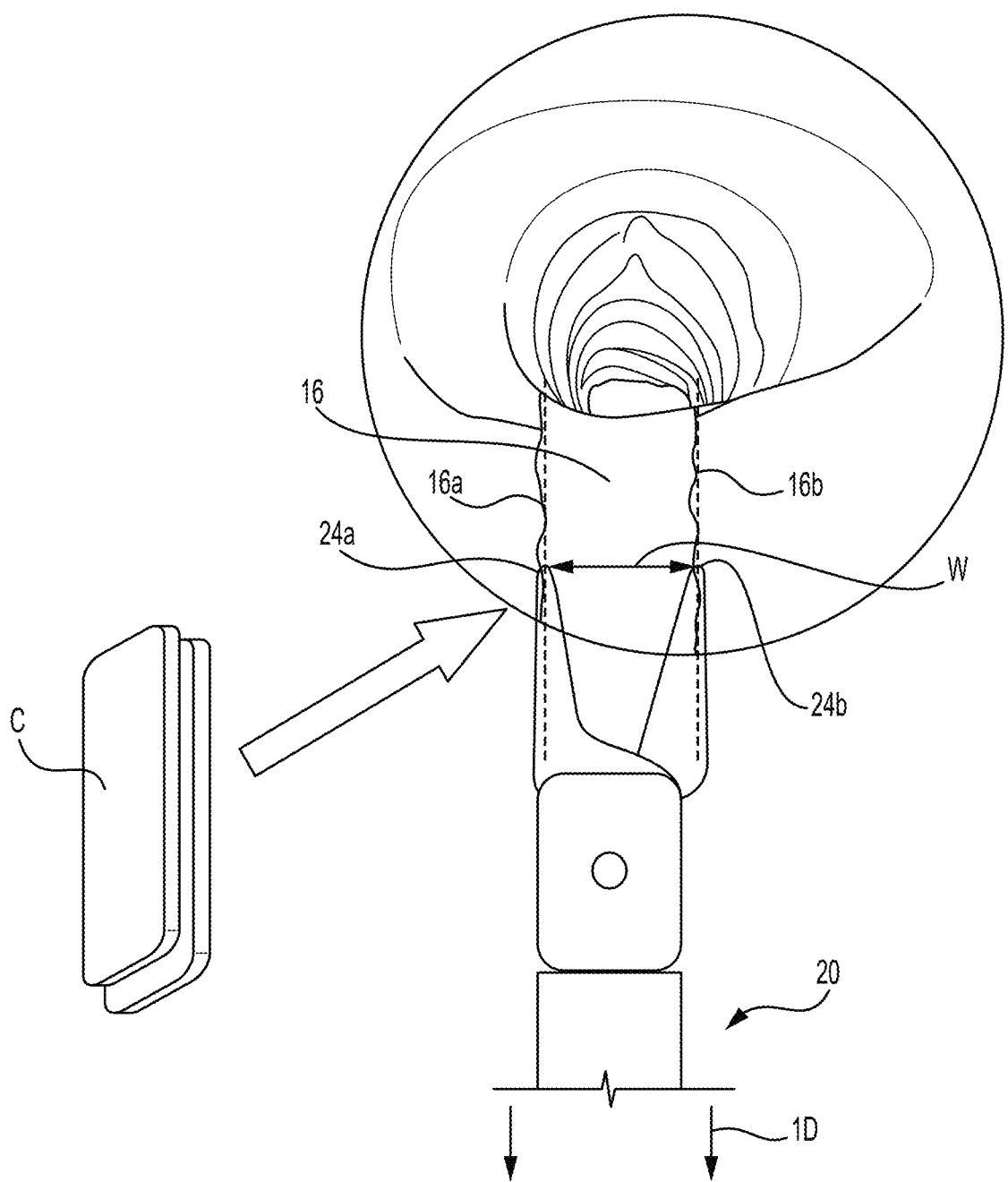
FIG. 1C is an environmental perspective view of a laryngeal forceps and cartilage graft used in a subglottic stenosis repair procedure.
Figure 1D:
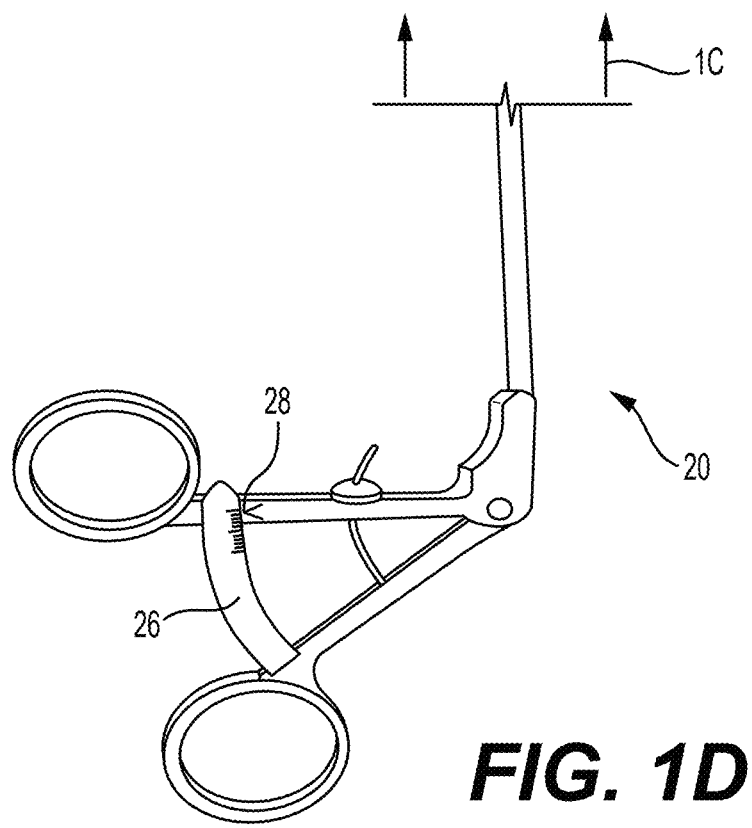
FIG. 1D is a perspective view of a measurement scale of the laryngeal forceps of FIG. 1C.

A width measurement W is obtained (as shown in FIG. 1C) of the recipient site 16 where the cartilage graft C will be placed by inserting a laryngeal forceps 20 into the laryngoscope 10 and aligning a first pointer tip 24a and second pointer tip 24b of the laryngeal forceps 20 with first and second sides 16a, 16b, respectively, of the recipient site 16. The width W is shown by a measurement scale 26 provided on the laryngeal forceps, shown in FIG. 1D, indicating a distance value 28 equaling a distance between the first pointer tip 24a and second pointer tip 24b aligned with respective first and second sides 16a, 16b of the recipient site 16.

Figure 1E:
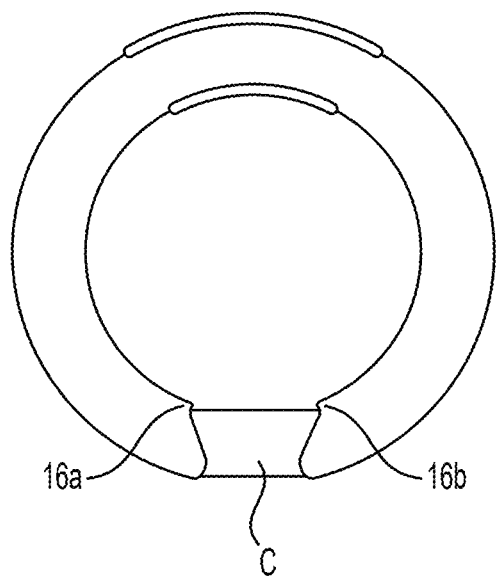
FIG. 1E is a top view of a graft inserted into a recipient site in a stenosis repair procedure.

The method further includes shaping the cartilage graft C using cutting instruments (not shown) to a width equal to or less than the width measurement W of the recipient site 16, as measured by the laryngeal forceps 20, and inserting the cartilage graft C into the recipient site 16, as shown in FIG. 1E.

Turning to FIG. 2A, 2B, further details of laryngeal forceps 20 will be described. The laryngeal forceps 20 terminate in a pair of clamping jaws 22 including a first jaw 22a having first pointer tip 24a and second jaw 22b having second pointer tip 24b. The first jaw 22a and second jaw 22b may be triangular and tapered for precisely pointing to a particular region of interest, such as the recipient site 16 of FIG. 1C. A handle 30 of the forceps includes a first arm 32a and second arm 32b joined at a pivot point 34. The handle 30 is mechanically coupled to the pair of clamping jaws 22 through shaft 36 and controls opening and closing of the clamping jaws 22 through an opening and closing motion of the first arm 32a and second arm 32b. Shaft 36 connects the pair of clamping jaws 22 to the handle 30, and includes mechanical means for opening and closing the pair of clamping jaws 22 including, but not limited to, a hinged lever connected to the jaws and a sliding rod connected to the handle, or alternatively a spring biased rod or cable connecting the handle to the jaws at a hinge or pivot located at the base of the jaws. Other means for accomplishing the opening and closing of jaws 22 by handle 30 may be provided by shaft 36 as are generally known in the art of forceps.

To accommodate insertion through a laryngoscope for procedures described involving laryngotracheal reconstruction, the shaft 36 of the laryngeal forceps 20 may be between about 20 cm long and about 60 cm long. In particular, the shaft may be about 24 cm long. As used herein, the term "about" refers to a ±10% variation from the nominal value unless otherwise indicated or inferred. A diameter of the shaft may be between about 3 mm and about 7 mm. In particular, a diameter of the shaft may be about 4 mm.

Measurement scale 26 may include an arcuate arm 27 extending between the first arm 32a and second arm 32b of the handle 30. A plurality of graduated size markings 26a are included on arcuate arm 27 and a pointer 29 indicates distance value 28 among the graduated size markings 26a, shown in FIG. 2A, equal to a distance between the first pointer tip 22a and second pointer tip 22b. A thumbscrew, or other clamping means, 38 may be included as well as screw bar or clamp bar 39 for locking the first arm 32a and second arm 32b of the handle 30 into a fixed position, and correspondingly fixing the first jaw 22a and second jaw 22b.

The measurement scale of the laryngeal forceps may include a digital display 26b shown in FIG. 2B with a numerical reading showing a distance value 28 between the first pointer tip 22a and second pointer tip 22b. Digital display 26b would necessarily include an appropriate power source, circuitry, sensors and on/off buttons as are generally known in the art of digital calipers.

It is to be understood that the method of stenosis repair using a laryngeal forceps is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method for repairing stenosis in an airway of a patient, comprising:

harvesting a cartilage graft from the patient;

inserting a laryngoscope into a respiratory tract of the patient to obtain visual access of a stenotic region in the patient's respiratory tract;

preparing the stenotic region of the patient's respiratory tract by removing stenotic tissue to create a recipient site for insertion of the cartilage graft;

obtaining a width measurement of the recipient site by inserting an elongated shaft of a laryngeal forceps into the laryngoscope and aligning a first pointer tip and second pointer tip of the laryngeal forceps with first and second sides, respectively, of the recipient site, wherein the width measurement is shown by a measurement scale provided on the laryngeal forceps indicating a distance value between the first pointer tip and second pointer tip, wherein the measurement scale is a digital display positioned on an arcuate arm extending between a first arm and second arm of a handle of the laryngeal forceps and wherein the elongated shaft is between about 20 cm and about 60 cm long and has a diameter between about 3 mm and about 7 mm;

fixing the first pointer tip and second pointer tip using a thumbscrew, wherein the thumbscrew extends between the first arm and the second arm of the handle, and the thumbscrew is positioned between the digital display and the elongated shaft, and wherein the digital display is positioned between finger holds of the handle and the thumbscrew;

shaping the cartilage graft to a width equal to or less than the width measurement of the recipient site as measured by the laryngeal forceps; and inserting the cartilage graft through the laryngoscope and into the recipient site.

2. The method for repairing stenosis in an airway of a patient as recited in claim 1, wherein the laryngeal forceps comprises:

a pair of clamping jaws including a first jaw terminating in the first pointer tip and a second jaw terminating in the second pointer tip;

wherein the handle is mechanically coupled to the pair of clamping jaws and is configured to control opening and closing of the clamping jaws through an opening and closing motion of the first arm and second arm; and wherein the elongated shaft comprises mechanical means for opening and closing the pair of clamping jaws through the opening and closing motion of the handle.

3. The method for repairing stenosis in an airway of a patient as recited in claim 2, wherein the first jaw and second jaw are triangular.

4. A method for repairing stenosis in an airway of a patient, comprising:

harvesting a cartilage graft from the patient;

inserting a laryngoscope into a respiratory tract of the patient to obtain visual access of a stenotic region in the patient's respiratory tract;

preparing the stenotic region of the patient's respiratory tract by removing stenotic tissue to create a recipient site for insertion of the cartilage graft;

obtaining a width measurement of the recipient site by inserting an elongated shaft of a laryngeal forceps into the laryngoscope and aligning a first pointer tip and second pointer tip of the laryngeal forceps with first and second sides, respectively, of the recipient site, wherein a width measurement is shown by a measurement scale provided on the laryngeal forceps indicating a distance value between the first pointer tip and second pointer tip, wherein the measurement scale includes an arcuate arm extending between a first arm and second arm of a handle of the laryngeal forceps and the measurement scale includes a plurality of graduated size markings thereon and a pointer indicating a value among the graduated size markings equaling a distance between the first pointer tip and second pointer tip, and wherein the elongated shaft is between about 20 cm and about 60 cm long and has a diameter between about 3 mm and about 7 mm;

fixing the first pointer tip and second pointer tip using a thumbscrew, wherein the thumbscrew extends between the first arm and the second arm of the handle, and the thumbscrew is positioned between the measurement scale and the elongated shaft, and wherein the measurement scale is positioned between finger holds of the handle and the thumbscrew;

shaping the cartilage graft to a width equal to or less than the width measurement of the recipient site as measured by the laryngeal forceps; and inserting the cartilage graft through the laryngoscope and into the recipient site.

5. The method for repairing stenosis in an airway of a patient as recited in claim 4, wherein the laryngeal forceps comprises:

a pair of clamping jaws including a first jaw terminating in the first pointer tip and a second jaw terminating in the second pointer tip;

wherein the handle is mechanically coupled to the pair of clamping jaws and is configured to control opening and closing of the clamping jaws through an opening and closing motion of the first arm and second arm; and wherein the elongated shaft comprises mechanical means for opening and closing the pair of clamping jaws through the opening and closing motion of the handle.

6. The method for repairing stenosis in an airway of a patient as recited in claim 5, wherein the first jaw and second jaw are triangular.

\* \* \* \* \*